US008424920B2

(12) United States Patent
Gilbreath et al.

(10) Patent No.: US 8,424,920 B2
(45) Date of Patent: Apr. 23, 2013

(54) MULTI-PORT FLUID CONNECTORS, SYSTEMS AND METHODS (75) Inventors: Donald R. Gilbreath, Castle Rock, CO (US); Geoffrey Richard Keast, Cambs England (GB)

(73) Assignee: The Gates Corporation, Denver, CO (US)

(*) Notice: Subject to any disclaimer, the term of this patent is extended or adjusted under 35 U.S.C. 154(b) by 503 days.

(21) Appl. No.: 12/380,995

(22) Filed: Mar. 6, 2009

(65) Prior Publication Data
US 2009/0232585 A1 Sep. 17, 2009

Related U.S. Application Data (60) Provisional application No. 61/068,585, filed on Mar. 7, 2008.

(51) Int. Cl.
*F16L 17/00* (2006.01)
(52) U.S. Cl.
USPC ..................................... 285/124.4; 285/124.3
(58) Field of Classification Search ............... 285/120.1, 285/124.3, 124.4, 19, 20
See application file for complete search history.

(56) References Cited

U.S. PATENT DOCUMENTS

| | | | | |
|---|---|---|---|---|
| 1,852,279 A | * | 4/1932 | Armacost et al. | 285/124.4 |
| 1,871,340 A | * | 8/1932 | Pielstick | 137/315.09 |
| 2,475,468 A | * | 7/1949 | Desmond | 285/123.3 |
| 2,578,542 A | * | 12/1951 | Fletcher et al. | 285/124.4 |
| 3,842,870 A | * | 10/1974 | Burgess | 141/286 |
| 3,869,153 A | | 3/1975 | DeVincent et al. | |
| 3,929,356 A | | 12/1975 | DeVincent et al. | |
| 4,089,549 A | * | 5/1978 | Vyse et al. | 285/124.4 |
| 4,171,559 A | * | 10/1979 | Vyse et al. | 29/407.01 |
| 4,378,124 A | * | 3/1983 | Weirich et al. | 285/124.4 |
| 4,382,618 A | * | 5/1983 | Grisebach | 285/124.4 |
| 4,382,619 A | * | 5/1983 | Grisebach | 285/124.4 |
| 4,544,185 A | * | 10/1985 | Weirich et al. | 285/124.4 |
| 4,596,149 A | * | 6/1986 | Frantz | 73/756 |
| 4,615,546 A | * | 10/1986 | Nash et al. | 285/26 |
| 4,694,859 A | * | 9/1987 | Smith, III | 137/614.04 |
| 4,770,207 A | * | 9/1988 | Hofmann | 137/557 |
| 4,794,937 A | * | 1/1989 | Hofmann | 137/614.05 |
| 4,915,419 A | * | 4/1990 | Smith, III | 285/26 |
| 5,201,552 A | * | 4/1993 | Hohmann et al. | 285/124.4 |
| 5,316,347 A | * | 5/1994 | Arosio | 285/26 |
| 5,507,530 A | * | 4/1996 | Mahaney | 285/26 |
| 5,829,337 A | * | 11/1998 | Barden | 91/432 |

(Continued)

FOREIGN PATENT DOCUMENTS

WO 93/22594 11/1993

*Primary Examiner* — Aaron Dunwoody
(74) *Attorney, Agent, or Firm* — P. N. Dunlap, Esq.; J. A. Thurnau, Esq.

(57) ABSTRACT

A multi-port connector includes a plate employing a plurality of coupling retention mechanisms used to hold a plurality of fluid connectors in alignment for deployment with a respective plurality of fluid ports defined in a structure. The couplings may be loosely retained in the plate to facilitate alignment with the ports and ultimately insertion of the connectors into the ports. Each of the coupling retention mechanisms might be an opening through the plate with engagement mechanism defined within, or in conjunction with, the opening. In accordance with various embodiments of the present invention a (central) fastener may pass through the plate to selectively draw and secure the plurality of fluid connectors into engagement with the respective plurality of ports.

24 Claims, 7 Drawing Sheets

U.S. PATENT DOCUMENTS

| | | | |
|---|---|---|---|
| 5,988,697 A * | 11/1999 | Arosio | 285/124.1 |
| 6,017,065 A * | 1/2000 | Hellesoe | 285/25 |
| 6,550,815 B2 * | 4/2003 | Zitkowic et al. | 285/120.1 |
| 6,591,684 B2 * | 7/2003 | Gegalski et al. | 73/715 |
| 6,595,552 B1 * | 7/2003 | Mortari | 285/24 |
| 6,860,290 B2 * | 3/2005 | Knuthson | 137/594 |
| 7,073,825 B2 * | 7/2006 | Takada et al. | 285/124.1 |
| 7,338,599 B2 * | 3/2008 | Hiranga et al. | 210/232 |
| 7,389,794 B2 * | 6/2008 | Knuthson | 137/614.02 |
| 7,703,812 B2 * | 4/2010 | Asam et al. | 285/38 |
| 7,717,471 B2 * | 5/2010 | Langenfeld et al. | 285/38 |
| 7,726,699 B2 * | 6/2010 | Keirsgieter | 285/305 |
| 7,731,244 B2 * | 6/2010 | Miros et al. | 285/317 |
| 2002/0070546 A1 | 6/2002 | Johll, Jr. et al. | |
| 2005/0242581 A1 * | 11/2005 | Nowling et al. | 285/307 |
| 2005/0285390 A1 * | 12/2005 | Martin | 285/124.5 |

* cited by examiner

MULTI-PORT FLUID CONNECTORS, SYSTEMS AND METHODS

CROSS-REFERENCE TO RELATED APPLICATION

This application claims the benefit of U.S. Provisional Application No. 61/068,585, entitled Multi-Port Fluid Connectors, Systems and Methods, filed Mar. 7, 2008, which is incorporated herein by reference.

BACKGROUND OF THE INVENTION

1. Field of the Invention

This invention relates generally to fluid power systems, more particularly to fluid connections, and specifically to multi-port fluid connectors, systems and methods.

2. Description of the Prior Art

In many fluid power applications, such as joysticks, several fluid connections are routed into a tight space, with each of a number of couplings needing to be mated with a proper port. To replace a hose in such a group, often other hoses need to be removed to gain access to the hose of interest. Also, replacing or installing a multi-port device, such as a joystick, requires the removal or installation of several connections individually, requiring wrenching in very tight spaces. Such connections commonly require proper torquing, which can be quite challenging in tight confines. These issues have traditionally been dealt with through requiring some minimal spacing between ports in such applications, resulting rather bulky installations.

With the advent of quick-connect technology, individual connections can be made much quicker, but the proper matching of ports and stems and the associated decision time to make connections is not improved. Also, all quick-connect fittings to date require a recess or retainer groove in the port (which adds difficulty to machining) or use of an adaptor. Also, quick connect ports generally require relatively greater port depth.

Existing multi-port solutions are "add-ons," where a hose connector must seal to a plate and the plate must in turn seal to a mating surface, resulting in multiple possible leak paths for each hose. These solutions are expensive, specialized, and are typically directed to valved quick connectors, designed for applications where disconnections and connections are frequent and must not drip.

SUMMARY

The present invention is directed to multi-port fluid connectors, systems, and methods that separate the functions of sealing and retention. In accordance with various embodiments of the present invention multiple hydraulic lines, or similar fluid lines, are tied together in a plate, helping assure that all lines go into a proper port. This plate may be connected to, or disconnected from, associated equipment by a mechanism typically unrelated to the ports, such as a separate threaded fastener.

The present connectors, systems, and methods provide a mechanism for connecting multiple hydraulic lines at once, particularly in joystick or similar applications where routing is tight. Advantageously, significant time savings may be available by making several connections at once. In accordance with the present invention there is also a potential for standard port patterns that may facilitate use of the present invention.

In accordance with the present invention, port bores may be relatively shallow for sealing, so machining may be relatively simple and ports may be packed relatively tightly together, which might facilitate more compact hydraulic solutions. Thus, smaller manifolds and valves can be designed through the use of such shallower and more tightly packed ports. Furthermore, the present invention eliminates the need for adapters, and risk of mechanical manipulation damage to a connection is minimized since ports are not used for retention, potentially enabling further use of lower cost plastic components. Also, embodiments of the present invention eliminate the lost time and unsafe conditions associated with incorrectly placed connections.

Embodiments of the present multi-port connector include a plate having a plurality of coupling retention mechanisms used to hold a plurality of fluid connectors in alignment for deployment with a respective plurality of fluid ports defined in a structure. In accordance with various embodiments of the present invention the couplings may be loosely retained in the plate to facilitate alignment with the ports and ultimately insertion of the connectors into the ports.

In the various embodiments of the present invention, each of the coupling retention mechanisms might employ an opening through the plate with the engagement mechanism defined within or by the opening, or deployed in conjunction with the opening In some embodiments the retention mechanism retains a respective fluid connector in a respective opening using a snap ring disposed on the respective fluid connector and a retention chamfer defined by the respective opening. In such an embodiment the retention mechanism might further comprise a shoulder defined by the respective fluid connector, spaced apart from the snap ring.

In other embodiments, the engagement mechanism might be a snap-clip that could expand to accept and retain a body of one of the couplings. In particular, the opening in the plate might be generally oval with the snap clip defined in one end of the oval and a generally circular, larger portion defined by the other end of the opening, through which at least a portion of the coupling body can pass. Alternatively, such a generally oval shaped portion could include a generally circular portion through which at least a portion of the coupling body can pass in one end and a shouldered portion in the other end adapted to retain the coupling body in conjunction with a spring disposed over the coupling body.

In accordance with various embodiments of the present invention one or more fasteners may pass through the plate to selectively secure the plate to the structure, and thus pull and secure the plurality of fluid connectors in engagement with the respective plurality of ports. Various embodiments of the present invention make use of a central fastener, which provides equal loading for drawing the connectors into the ports.

Thus, in accordance with embodiments of the present invention a multi-port connection system might employ a plurality of fluid ports defined in a structure, such as a piece of hydraulic equipment. Each of the fluid ports might be a bore having a lead-in taper to facilitate reception of a seal and/or retaining clip disposed on a respective connector. The system embodiment might also employ a connector plate, such as described above, that has a plurality of coupling retention mechanisms for holding a plurality of fluid connectors in alignment for deployment with respective ones of the plurality of fluid ports. System embodiments also employ a central fastener passing through the plate to selectively secure the plate to the structure. As a result, each of the fluid connectors engages one of the ports. This fastener may be a bolt threaded into a hole defined in the structure, generally central to the fluid ports.

In operation, a method for connecting multiple ports in accordance with the present invention includes retaining a plurality of fluid connectors in a generally fixed relationship to each other. Consistent with the above description, this retaining might include loosely retaining the couplings in the generally fixed relationship to each other, such as with a plate using a plurality of coupling retention mechanisms, to facilitate alignment and engagement with a respective plurality of fluid ports. Also consistent with the above description, each of the fluid connectors may be disposed through an opening defined in the plate and each of the couplings may be engaged with an engagement mechanism defined in or by the opening, such as a retention chamfer or snap-clip.

This engagement may be accomplished in accordance with various embodiments of the present invention by disposing a snap ring on each of the fluid connectors and disposing each of the fluid connectors through a respective opening defined in the plate. The snap ring is preferably received by a retention chamfer defined by the respective opening. For example, each of the fluid connectors may be pushed through the respective opening until a shoulder defined on the respective fluid connector, spaced apart from the snap ring, contacts the plate on a side of the plate opposite the retention chamfer, and the snap ring is received in the retention chamfer. A groove step defined on the connector may cooperate with the retention chamfer on the plate such that the clip is trapped between the step and the retention chamfer. Preferably, a dust seal disposed between the shoulder and the plate urges the connector into such a locked position.

In various other embodiments of the present invention engagement between the fluid connectors and retention plate may be accomplished by sliding the coupling "sideways" within the opening to engage the coupling with the engagement mechanism (i.e. the aforementioned snap clip). This retention by a snap-clip might expand a respective snap clip to accept a body of one of the couplings to grip a groove defined in the coupling body, with the snap clip.

Embodiments of these methods of connecting multiple ports in accordance with the present invention further includes aligning the fluid connectors with a respective plurality of fluid ports defined in a structure and simultaneously securing the plurality of fluid connectors in engagement with the respective plurality of ports. This securing might include passing a fastener through a central hole defined in the plate and tightening the fastener to draw the fluid connectors into the ports and/or secure the plate to the structure.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

FIGS. 1, 2, 6 and 7 are partially fragmented perspective environmental views showing embodiments 100 and 600 of a multi-port fluid connector of the present invention. The illustrated embodiments include plate 101 or 601. These plates may have a plurality of openings 102, which in the case of plate 601 may define a plurality of coupling retention mechanisms 602 used to hold a plurality of fluid connectors 103 or 603 in alignment for deployment with a respective plurality of fluid ports 105 defined in structure 110. Structure 110 might be a hydraulic control joystick, another hydraulic manifold, or the like. In accordance with various embodiments of the present invention the couplings, illustrated as stems having at least one o-ring 115 or 615 and a backing ring 117 or 617, may be loosely retained in the plate to facilitate alignment with the ports and ultimately insertion of connectors into the ports.

Alternatively, sealing for each connection could be made on the port face, rather than in a bore. Advantageously this might eliminate any "tilting" concerns during installation.

In the illustrated embodiments, six hydraulic hoses 120 or 620 are loosely connected to plate 101 or 601, allowing self-alignment during installation. Threaded fastener 125 or 625 preferably draws the connectors into the ports and provides the retention for all six connections. The multi-port pattern illustrated consists of six simple bores 110, each with lead-in taper 130 for guiding seal 115 or 615, and a separate threaded hole to receive the fastener. This simplifies port machining, as it is all done using ordinary processes. Fastener 125 or 625 also provides mechanical advantage to draw in aloof the seal packs into the port bores at once.

As may be better seen in FIGS. 3, 4, and 8-12, each of the coupling retention mechanisms might take the form of an opening through the plate with engagement mechanisms defined within or by the openings and/or deployed in conjunction with the openings, as discussed below . . .

In accordance with various embodiments of the present multi-port connector, such as system 100 illustrated in FIGS. 1-5 the retention mechanisms provided by the plate might comprise smooth bore openings 102, which may have lead-in and retention chamfers, 135 and 137, respectively. In such embodiments retention is accomplished via a clip or snap ring 140 disposed on coupling body 103, which can be compressed by lead-in chamfer 135 when the coupling body is inserted into plate opening 102 and, which expands to engage retention chamfer 135 when the coupling body is fully inserted into the opening shoulder 145 will contact the plate. This preferably traps coupling body 103 in opening 102, with optional dust or weather seal 150 bearing on the outside of the plate, between shoulder 145 and the plate, and the snap ring bearing on the retention chamfer on the opposite side of the plate. Groove step 147 defined on the connector may cooperate with the retention chamfer 135 on the plate such that clip 140 is trapped between the step and the retention chamfer, particularly after the plate is tightened to the structure. As noted, the fitting may mount dust seal 150. When such a fitting is installed, the dust seal is deployed on top of the plate. This preferably serves not only to keep dust and debris out, but also to energize the fitting prior to pressurization of hose, holding the snap ring in position over step 147 on the fitting stem. Advantageously, a plate having smooth bores avoids complexity, is relatively straight forward to manufacture, and is compact, facilitating a compact overall design.

Figure 6:
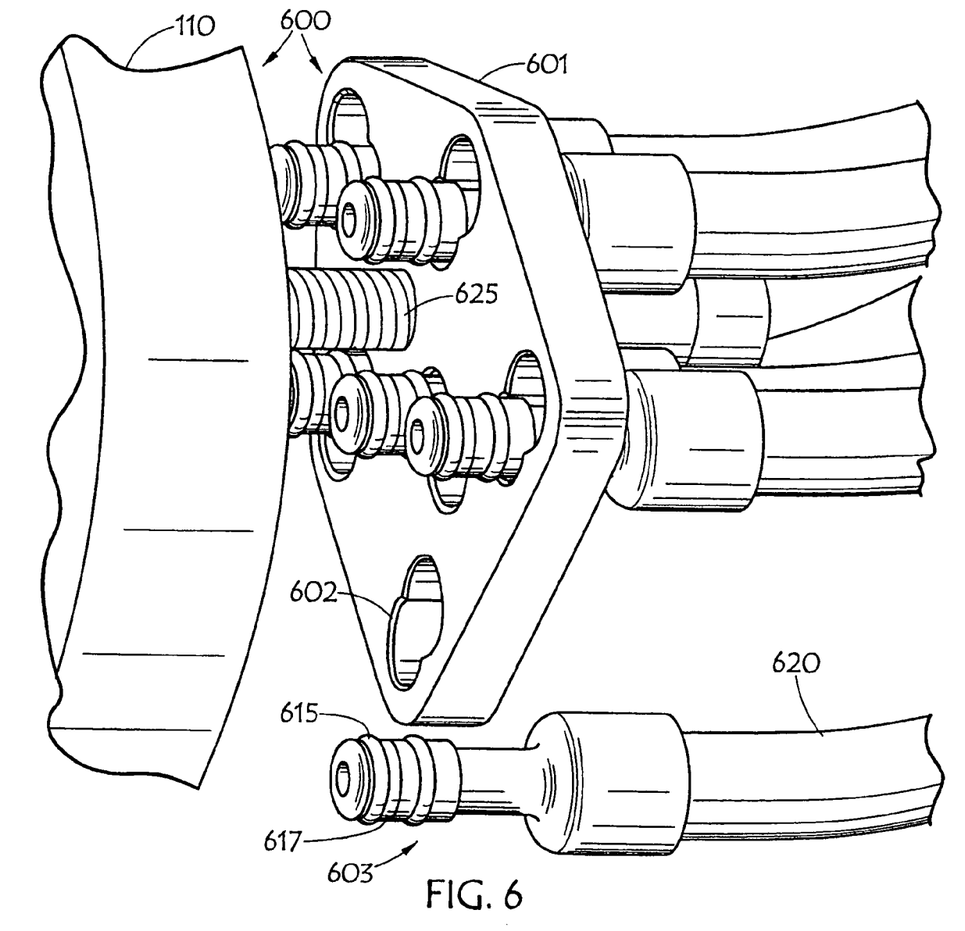
FIG. 6 is a partially fragmented perspective environmental view showing another embodiment of a multi-port fluid connector of the present invention, with one hose removed from the retention plate.
Figure 7:
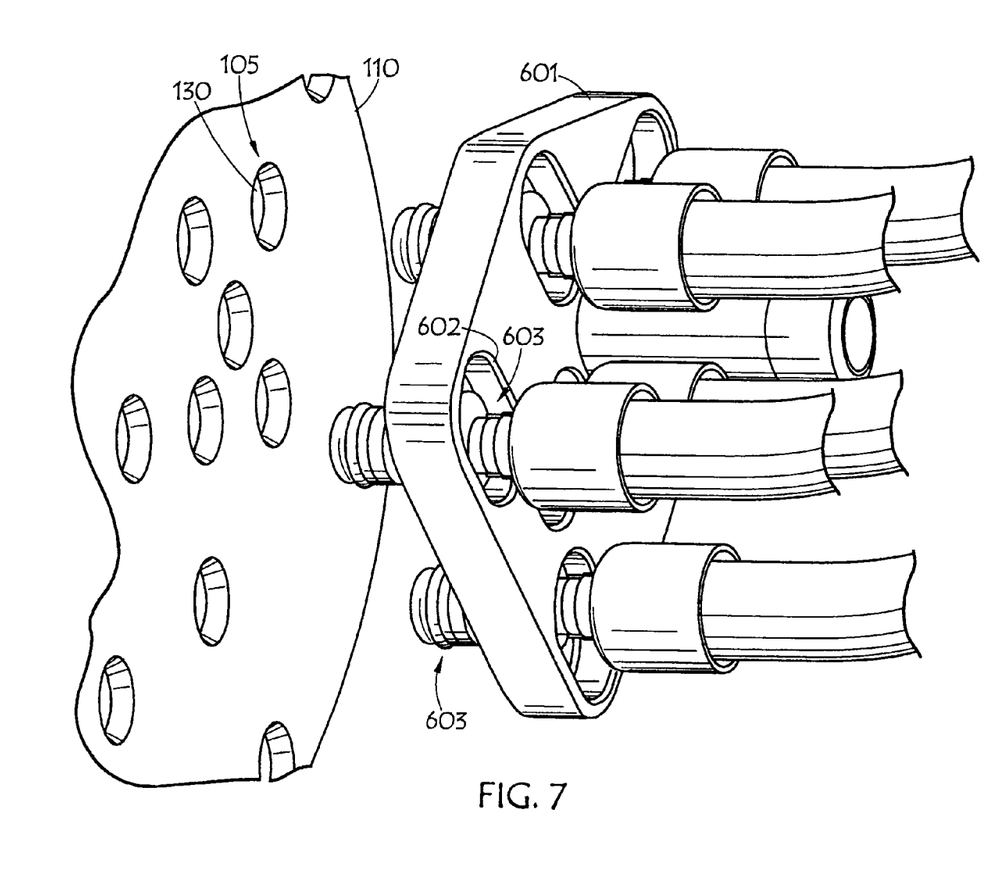
FIG. 7 is an opposite, partially fragmented perspective environmental view of the multi-port fluid connector embodiment of FIG. 6, with all the hoses disposed in the retention plate.
Figure 8:
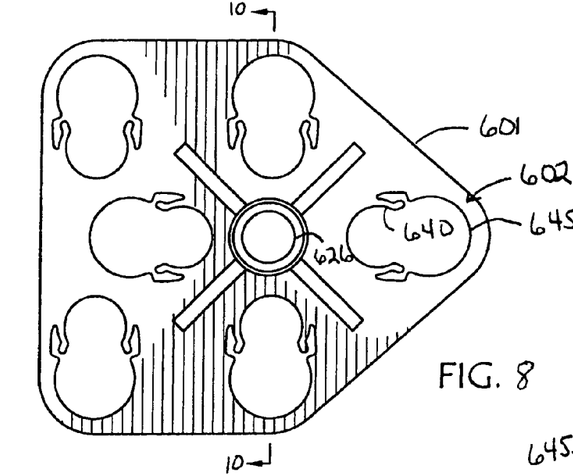
FIG. 8 is a "top" plan view of an embodiment of a multi-port fluid connector retention plate of the present invention.
Figure 9:
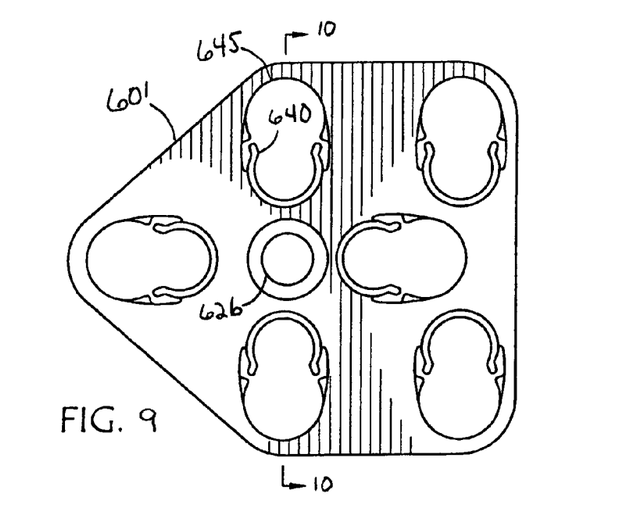
FIG. 9 is a "bottom" plan view of the plate of FIG. 8.
Figure 10:
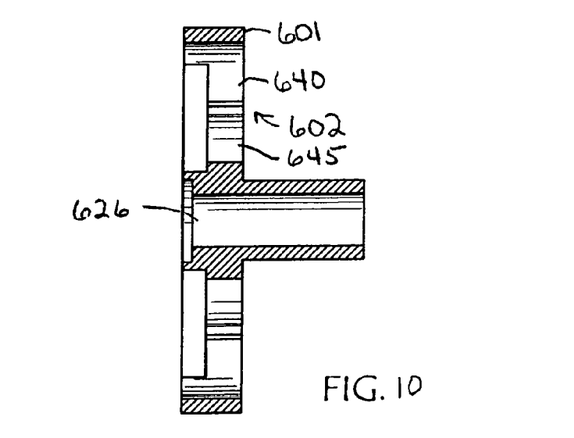
FIG. 10 is a generally cross-sectional fragmented view of the plate of FIGS. 8 and 9, taken generally along lines 10-10 of FIG. 9.
Figure 11:
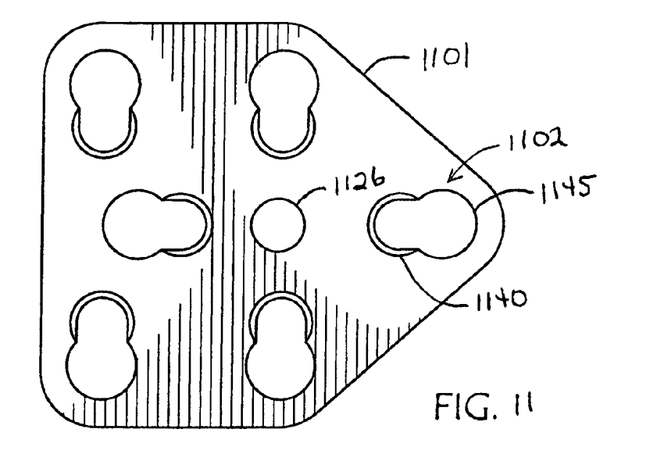
FIG. 11 is a "top" plan view of yet another embodiment of a multi-port fluid connector retention plate of the present invention.
Figure 12:
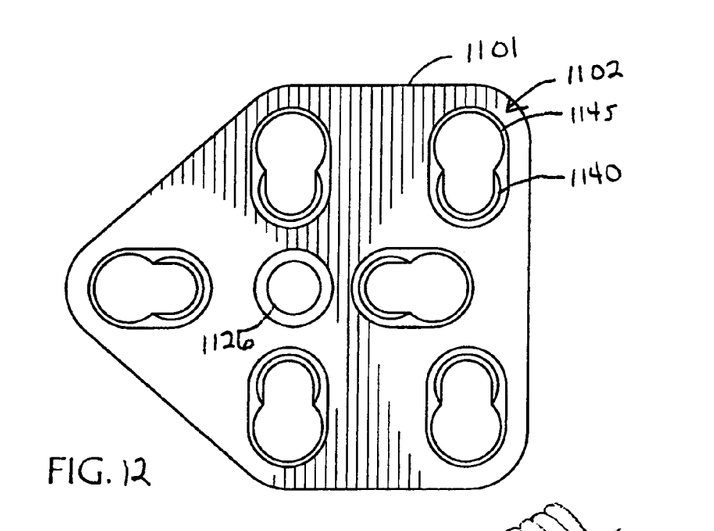
FIG. 12 is a "bottom" plan view of the plate of FIG. 11.
Figure 13:
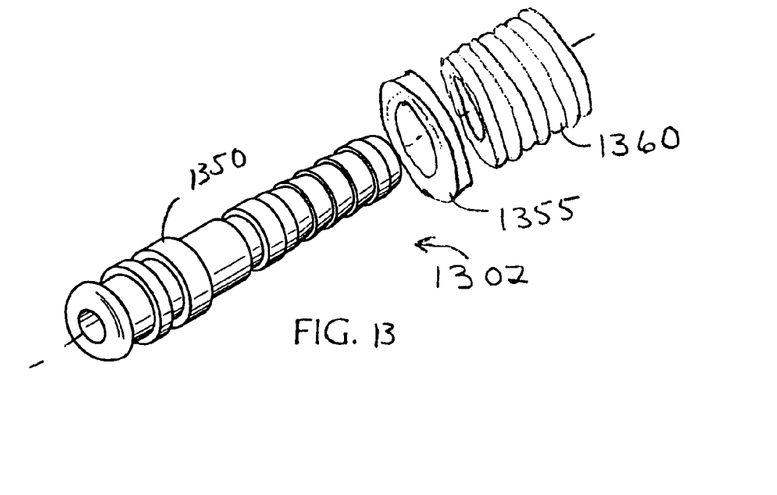
FIG. 13 is an exploded, generally perspective view of an embodiment of a connector stem, washer and spring for use in certain embodiments of the present invention.

In other embodiments the engagement mechanisms might take other forms, such as snap-clip 640 shown in FIGS. 8-10 or it may take another form, such as the spring-loaded retention mechanism using a plate such as shown in FIGS. 11 and 12 and a spring, washer, and the stem shown in FIG. 13. FIGS. 6 and 7 are intended to generically show such embodiments. Thus it should be appreciated that the connectors shown in FIGS. 6 and 7 might also have washers and springs disposed on them consistent with FIG. 13.

As best seen in FIGS. 8-10, snap clip 640 could expand to accept and retain a body of one of couplings. In particular, opening 602 might be generally oval with snap clip 640 defined in one end of the oval and a generally circular, larger portion 645 defined by the other end of the opening, through which at least a portion of the coupling body can pass.

Alternatively, as best seen in FIGS. 11 and 12, a generally oval shaped opening 1102 in alternative retention plate 1101 could include a generally circular portion 1145 through which at least a portion of the coupling body can pass in one end and shouldered portion 1140 in the other end adapted to retain the coupling body in conjunction with washer 1355 and spring 1360 that would preferably be disposed over the coupling body. A corresponding retention shoulder 1345 may be provided on corresponding hose connector 1302, such as shown in FIG. 13. In particular, a molded resilient ferrule may provide advantages because it is injected rather than crimped, facilitating the use of plastic stems as connectors.

Figure 1:
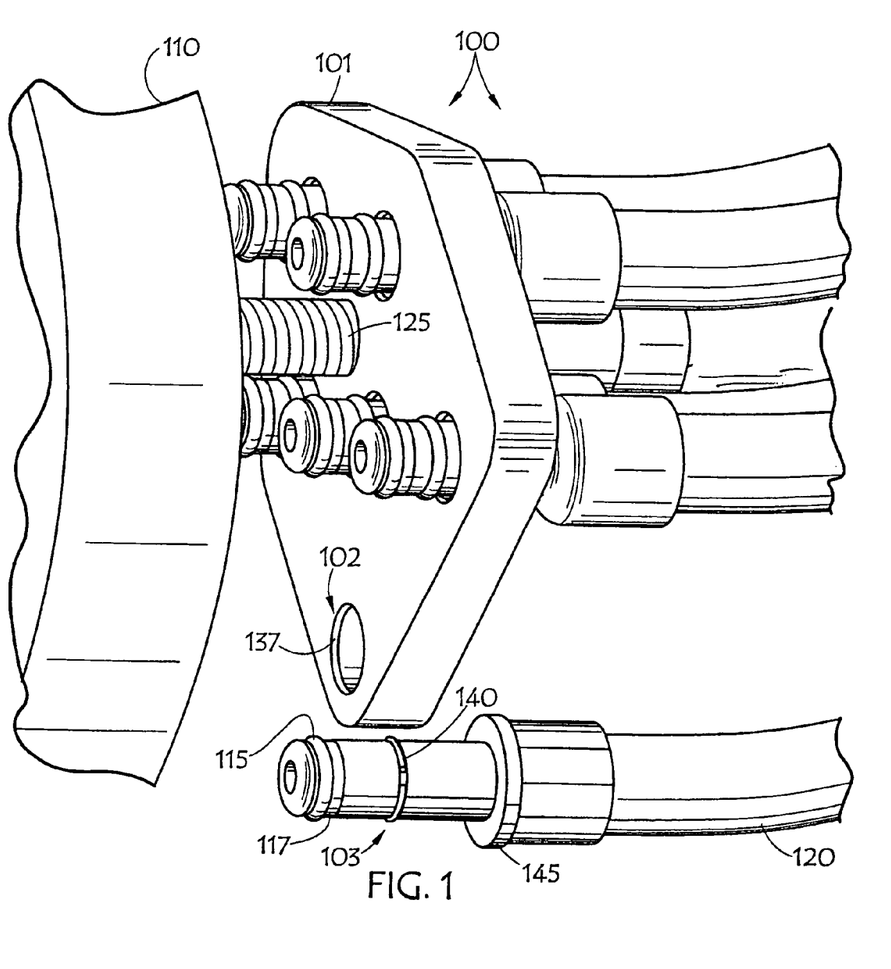
FIG. 1 is a partially fragmented perspective environmental view showing an embodiment of a multi-port fluid connector of the present invention, with one hose removed from the retention plate.
Figure 2:
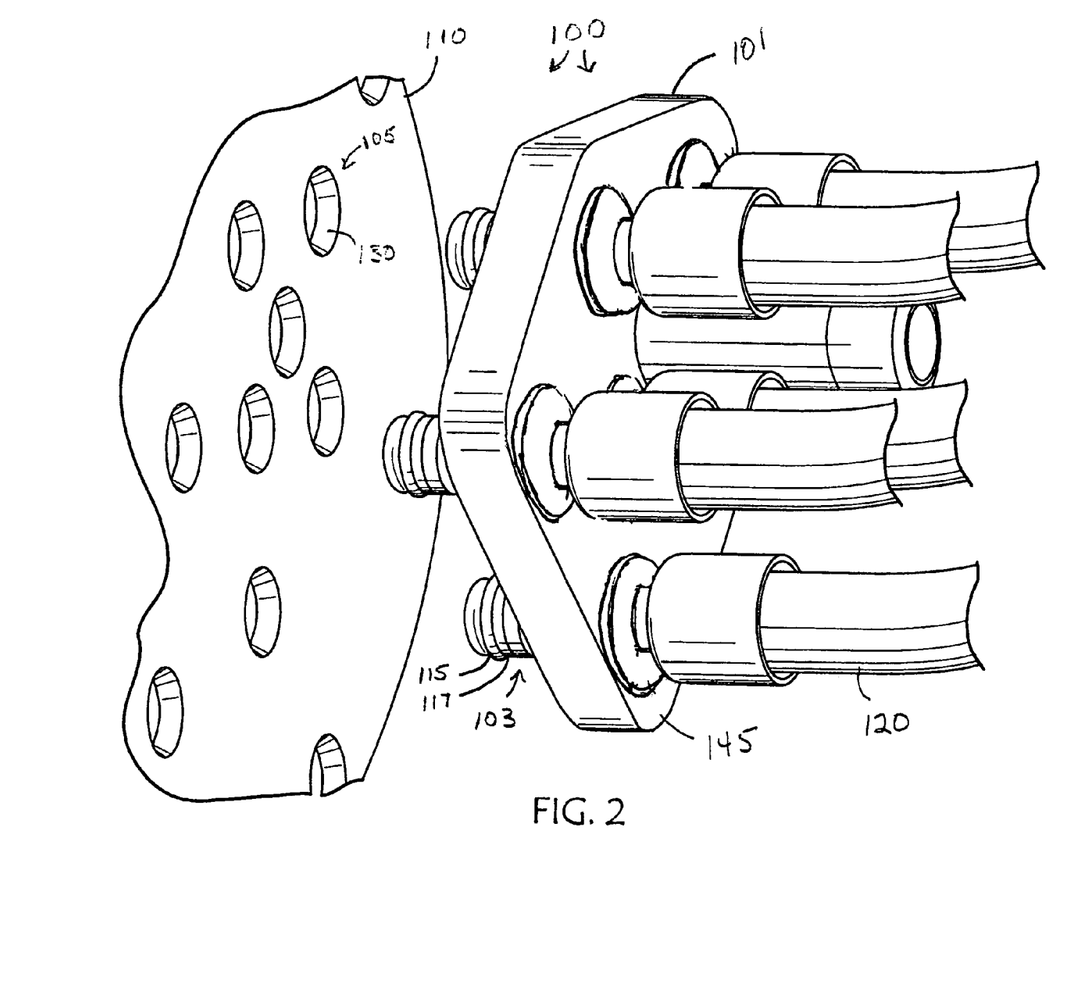
FIG. 2 is an opposite, partially fragmented perspective environmental view of the multi-port fluid connector embodiment of FIG. 1, with all the hoses disposed in the retention plate.
Figure 3:
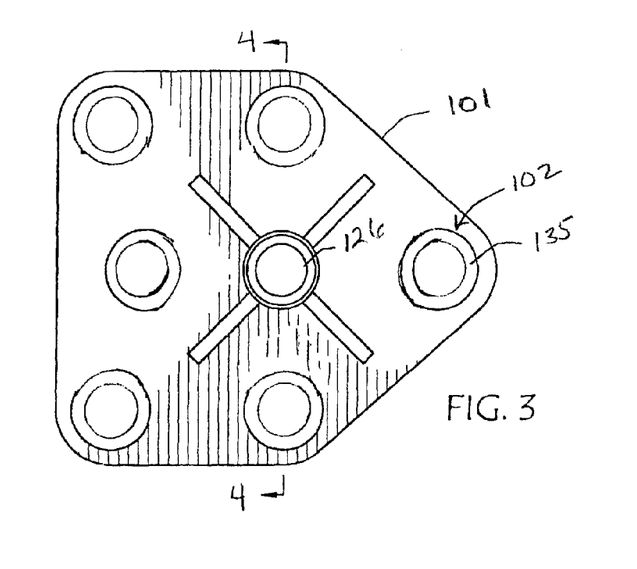
FIG. 3 is a "top" plan view of an embodiment of a multi-port fluid connector retention plate of the present invention for use in the embodiment shown in FIGS. 1 and 2.
Figure 4:
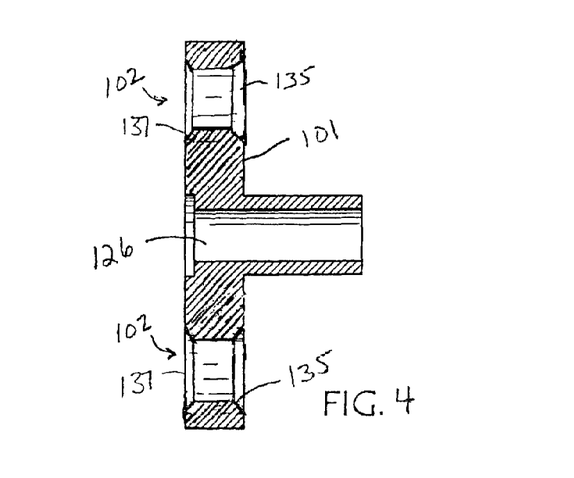
FIG. 4 is a generally cross-sectional fragmented view of the plate of FIGS. 3, taken generally along lines 4-4 of FIG. 3.
Figure 5:
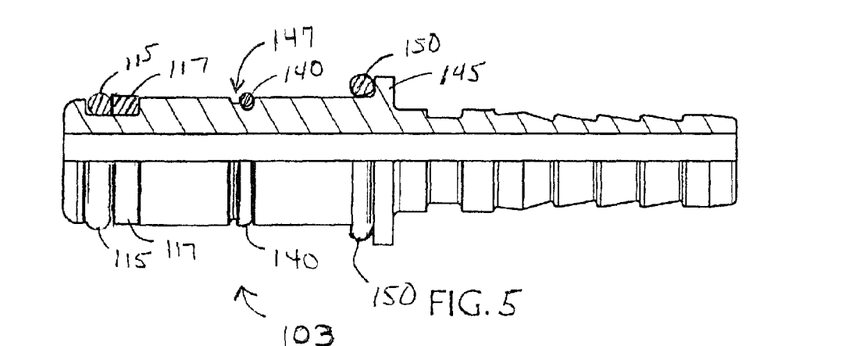
FIG. 5 is a fragmented generally quarter sectional view of an embodiment of a connector stem for use in the embodiments of FIGS. 1 through 4 of the present invention.

In accordance with various embodiments of the present invention one or more fasteners, such as centrally located bolt 125 or 625, best seen in FIGS. 1 or 6, might pass through the plate to selectively secure the plate to the structure, and thus pull and secure the plurality of fluid connectors in engagement with the respective ports. Preferably, fastener 125 or 625 is captured in the plate in a rotatable manner, such that unscrewing the fastener will pull the connectors out of their respective ports, avoiding any need to pry or otherwise separate the plate from the port structure.

In operation, a method for connecting multiple ports in accordance with the present invention includes retaining a plurality of fluid connectors 103 or 603 in a generally fixed relationship to each other, as shown in FIGS. 1, 2, 6 and 7. Consistent with the above description, this retaining might include loosely retaining the couplings in the generally fixed relationship to each other with a plate 101 or 601, such as one of the plates shown in FIGS. 3 and 4 or 8-12, using a plurality of coupling retention mechanisms. This retention of the connectors facilitates alignment and engagement of the connectors with a respective plurality of fluid ports 105. Also consistent with the above description, each of the fluid connectors may be disposed through an opening 102 or 602 defined in the respective plate, as shown in FIGS. 1, 2, 6 and 7. Each of the couplings may be engaged with an engagement mechanism defined in the opening, such as the snap-clips shown in FIGS. 8-10, retained by a spring and washer assembly such as shown in FIGS. 11-13 or retained by a snap ring such as shown in FIGS. 1-5. Engagement may be accomplished in accordance with various embodiments of the present invention by sliding the coupling "sideways" within the opening to engage the coupling with the engagement mechanism (i.e. the aforementioned snap clip). This retention by a snap-clip might expand a respective snap clip to accept a body of one of the couplings to grip a groove defined in the coupling body, with the snap clip. As noted methods of connecting multiple ports in accordance with the present invention preferably includes aligning the fluid connectors with a respective plurality of fluid ports defined in the structure. These methods also preferably include simultaneously securing the plurality of fluid connectors in engagement with the respective plurality of ports. This securing might include passing a fastener 125 or 625 through central hole 126, 626 or 1126 defined in the plate and threading the fastener into a threaded hole in the structure, drawing the connectors into the ports and ultimately securing the plate to the structure and the connectors into the ports.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A multi-port connector comprising:
    a plate having a plurality of fluid connector receptive openings therethrough for holding a plurality of fluid connectors in alignment for deployment with a respective plurality of fluid ports defined in a structure;
    a fastener passing through said plate selectively drawing said fluid connectors into the ports and securing said plate to the structure, said plate thus secured securing said plurality of fluid connectors in engagement with the respective plurality of ports; and
    a retention mechanism retaining respective fluid connectors in a respective opening, wherein said retention mechanism comprises a snap ring disposed on said respective fluid connector and a retention chamfer defined by the respective opening.

2. The multi-port connector of claim 1, wherein said retention mechanism further comprises a shoulder defined by said respective fluid connector, spaced apart from said snap ring, and a resilient seal disposed between said shoulder and said plate when said connector is installed in said plate, said resilient seal biasing said connector to engage said snap ring between a step defined in a snap ring groove on said connector and said retention chamfer.

3. A multi-port connector comprising:
    a plate having a plurality of fluid connector receptive openings therethrough for holding a plurality of fluid connectors in alignment for deployment with a respective plurality of fluid ports defined in a structure;
    a fastener passing through said plate selectively drawing said fluid connectors into the ports and securing said plate to the structure, said plate thus secured securing said plurality of fluid connectors in engagement with the respective plurality of ports; and
    a retention mechanism retaining respective fluid connectors in a respective opening;
    wherein each of said openings comprise at least one fluid connector engaging mechanism, and wherein said fluid connector engaging mechanism comprises a snap-clip.

4. The multi-port connector of claim 3 wherein said snap clip expands to accept and retain a body of one of said fluid connectors.

5. The multi-port connector of claim 3 wherein said opening is generally oval and said opening comprises said snap clip in one end and a generally circular larger portion through which at least a portion of said fluid connector body can pass in the other end.

6. A multi-port connector comprising:
    a plate having a plurality of fluid connector receptive openings therethrough for holding a plurality of fluid connectors in alignment for deployment with a respective plurality of fluid ports defined in a structure;
    a fastener passing through said plate selectively drawing said fluid connectors into the ports and securing said plate to the structure, said plate thus secured securing said plurality of fluid connectors in engagement with the respective plurality of ports; and
    a retention mechanism retaining respective fluid connectors in a respective opening;
    wherein each of said openings comprise at least one fluid connector engaging mechanism, and
    wherein said opening is generally oval and said opening comprises a generally circular larger portion through which at least a portion of said fluid connector body can pass in one end and a shouldered portion in the other end adapted to retain said fluid connector body in conjunction with a spring.

7. The multi-port connector of claim 6 wherein said fastener comprises a centrally disposed fastener rotatably retained in said plate.

8. The multi-port connector of claim 6 wherein said fluid connectors are loosely retained in said plate.

9. A multi-port connection system comprising:
    a plurality of fluid ports defined in a structure;
    a plate having a plurality of fluid connector receptive openings holding a plurality of fluid connectors in alignment for deployment with respective ones of said plurality of fluid ports;
    at least one fastener passing through said plate selectively drawing said fluid connectors into said ports and selectively securing said plate to said structure, said plate thus secured securing each of said fluid connectors in engagement with a one of said ports; and
    a threaded hole defined in said structure, generally central to said fluid ports, to receive said fastener.

10. The multi-port connection system of claim 9 wherein said fluid connectors are loosely retained in said plate.

11. The multi-port connection system of claim 9, further comprising a retention mechanism retaining respective fluid connectors in a respective opening.

12. A multi-port connection system comprising:
    a plurality of fluid ports defined in a structure;
    a plate having a plurality of fluid connector receptive openings holding a plurality of fluid connectors in alignment for deployment with respective ones of said plurality of fluid ports;
    at least one fastener passing through said plate selectively drawing said fluid connectors into said ports and selectively securing said plate to said structure, said plate thus secured securing each of said fluid connectors in engagement with a one of said ports; and
    a retention mechanism retaining respective fluid connectors in a respective opening;
    wherein said retention mechanism comprises a snap ring disposed on said respective fluid connector in a stepped snap ring and a retention chamfer defined by the respective opening.

13. A multi-port connection system comprising:
    a plurality of fluid ports defined in a structure;
    a plate having a plurality of fluid connector receptive openings holding a plurality of fluid connectors in alignment for deployment with respective ones of said plurality of fluid ports; and
    at least one fastener passing through said plate selectively drawing said fluid connectors into said ports and selectively securing said plate to said structure, said plate thus secured securing each of said fluid connectors in engagement with a one of said ports;
    wherein each of said openings comprise a fluid connector retention mechanism comprising at least one fluid connector engaging mechanism, and
    wherein said fluid connector engaging mechanism comprises a snap-clip.

14. The multi-port connection system of claim 13 wherein said snap clip expands to accept and retain a body of one of said fluid connectors and said opening is generally oval and said opening comprises said snap clip in one end and a generally circular larger portion through which at least a portion of said fluid connector body can pass in the other end.

15. A multi-port connection system comprising:
a plurality of fluid ports defined in a structure;
a plate having a plurality of fluid connector receptive openings holding a plurality of fluid connectors in alignment for deployment with respective ones of said plurality of fluid ports; and
at least one fastener passing through said plate selectively drawing said fluid connectors into said ports and selectively securing said plate to said structure, said plate thus secured securing each of said fluid connectors in engagement with a one of said ports;
wherein each of said openings comprise a fluid connector retention mechanism comprising at least one fluid connector engaging mechanism, and
wherein said opening is generally oval and said opening comprises a generally circular larger portion through which at least a portion of said fluid connector body can pass in one end and a shouldered portion in the other end adapted to retain said fluid connector body in conjunction with a spring and washer.

16. A multi-port connection system comprising:
a plurality of fluid ports defined in a structure;
a plate having a plurality of fluid connector receptive openings holding a plurality of fluid connectors in alignment for deployment with respective ones of said plurality of fluid ports; and
at least one fastener passing through said plate selectively drawing said fluid connectors into said ports and selectively securing said plate to said structure, said plate thus secured securing each of said fluid connectors in engagement with a one of said ports;
wherein said fastener comprises a centrally disposed fastener rotatably retained in said plate.

17. A method of assembling a connection, comprising:
retaining a plurality of fluid connectors in a generally fixed relationship to each other;
aligning said fluid connectors with a respective plurality of fluid ports defined in a structure; and
securing said plurality of fluid connectors in engagement with said respective plurality of ports generally simultaneously, whereby said connection is assembled;
wherein said retaining further comprises retaining said plurality of fluid connectors using a plate;
wherein said securing comprises: passing a fastener through a central hole defined by said plate; selectively securing said plate to said structure to generally simultaneously draw and secure said plurality of fluid connectors into engagement with said respective plurality of ports; and
wherein said retaining further comprises disposing a snap ring on each of said fluid connectors and disposing each of said fluid connectors through a respective opening defined in said plate.

18. The method of claim 17, wherein said snap ring is received by a retention chamfer defined by the respective opening and a stepped snap ring groove defined on the respective fluid connector.

19. The method of claim of claim 18, wherein said disposing comprises pushing each of said fluid connectors through the respective opening until a shoulder defined on the respective fluid connector, spaced apart from said snap ring, contacts said plate, on a side of said plate opposite said retention chamfer and said snap ring received therein.

20. A method of assembling a connection, comprising:
retaining a plurality of fluid connectors in a generally fixed relationship to each other;
aligning said fluid connectors with a respective plurality of fluid ports defined in a structure; and
securing said plurality of fluid connectors in engagement with said respective plurality of ports generally simultaneously, whereby said connection is assembled;
wherein said retaining further comprises retaining said plurality of fluid connectors using a plate;
wherein said retaining further comprises retaining said plurality of fluid connectors in said plate using a plurality of fluid connector retention mechanisms holding said plurality of fluid connectors in said generally fixed relationship to each other;
wherein said holding said plurality of fluid connectors in said generally fixed relationship to each other retains said fluid connectors in alignment for deployment with said respective plurality of fluid ports;
wherein said retaining further comprises disposing each of said fluid connectors through an opening defined in said plate and engaging each of said fluid connectors with an engagement mechanism defined in said opening; and
wherein said engagement mechanism comprises a snap-clip.

21. The method of claim 20 wherein said retaining of each of said fluid connectors comprises expanding a respective snap clip to accept a body of one of said fluid connectors and gripping said body with said snap clip.

22. The method of claim 21 wherein said gripping comprises gripping a groove defined in said body with arms of said snap-clip.

23. The method of claim 20 wherein said engaging comprises sliding said fluid connector sideways within said opening to engage said fluid connector with said engagement mechanism.

24. A method of assembling a connection, comprising:
retaining a plurality of fluid connectors in a generally fixed relationship to each other;
aligning said fluid connectors with a respective plurality of fluid ports defined in a structure; and
securing said plurality of fluid connectors in engagement with said respective plurality of ports generally simultaneously, whereby said connection is assembled;
wherein said retaining further comprises retaining said plurality of fluid connectors using a plate;
wherein said retaining further comprises retaining said plurality of fluid connectors in said plate using a plurality of fluid connector retention mechanisms holding said plurality of fluid connectors in said generally fixed relationship to each other;
wherein said holding said plurality of fluid connectors in said generally fixed relationship to each other retains said fluid connectors in alignment for deployment with said respective plurality of fluid ports;
wherein said retaining further comprises disposing each of said fluid connectors through an opening defined in said plate and engaging each of said fluid connectors with an engagement mechanism defined in said opening;
wherein said engaging comprises sliding said fluid connector sideways within said opening to engage said fluid connector with said engagement mechanism; and
wherein said engagement mechanism comprises a shouldered portion in said opening retaining said fluid connector body in conjunction with a spring and washer.

* * * * *